(12) United States Patent
McCarthy et al.

(10) Patent No.: US 12,314,595 B1
(45) Date of Patent: May 27, 2025

(54) METHOD AND APPARATUS FOR PERFORMANCE-BASED PORT SELECTION

(71) Applicant: Dell Products L.P., Round Rock, TX (US)

(72) Inventors: Jason McCarthy, Cambridge, MA (US); Girish Warrier, Natick, MA (US); Rongnong Zhou, South Grafton, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/420,908

(22) Filed: Jan. 24, 2024

(51) Int. Cl.
*G06F 3/06* (2006.01)

(52) U.S. Cl.
CPC .............. *G06F 3/065* (2013.01); *G06F 3/061* (2013.01); *G06F 3/0665* (2013.01); *G06F 3/0671* (2013.01)

(58) Field of Classification Search
CPC ........ G06F 3/065; G06F 3/061; G06F 3/0665; G06F 3/0671
USPC .................................................. 711/162, 154
See application file for complete search history.

(56) References Cited

U.S. PATENT DOCUMENTS

| | | | |
|---|---|---|---|
| 10,148,483 B1* | 12/2018 | Lippitt | G06F 3/061 |
| 2014/0112661 A1* | 4/2014 | Sakane | H04Q 11/0066 398/79 |
| 2015/0074299 A1* | 3/2015 | Maniwa | G06F 13/10 710/74 |
| 2017/0024295 A1* | 1/2017 | Klughart | G06F 13/4247 |
| 2019/0392354 A1* | 12/2019 | Yang | G06N 5/04 |
| 2022/0137845 A1* | 5/2022 | Crowley | G06F 11/2007 710/38 |

* cited by examiner

*Primary Examiner* — Than Nguyen
(74) *Attorney, Agent, or Firm* — Daly, Crowley, Mofford & Durkee, LLP.

(57) ABSTRACT

A method, comprising: generating a plurality of combined utilization vectors, each of the plurality of combined utilization vectors corresponding to a different one of a plurality of port pairs; updating the plurality of combined utilization vectors based on an expected usage of the storage entity to produce a plurality of updated utilization vectors; selecting one of the plurality of port pairs based on the plurality of updated utilization vectors; and assigning the selected port pair to the replication of data that is stored in the storage entity.

20 Claims, 6 Drawing Sheets

METHOD AND APPARATUS FOR PERFORMANCE-BASED PORT SELECTION

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a method is provided, comprising: detecting an event that signals a start of a replication of data that is stored in a storage entity, the replication being performed between a first storage system and a second storage system; identifying a plurality of first ports in the first storage system; identifying a plurality of second ports in the second storage system; generating a plurality of first utilization vectors, each of the plurality of first utilization vectors corresponding to a different one of the plurality of first ports, each of the plurality of first utilization vectors including a respective set of first elements, each first element identifying a utilization of the first utilization vector's corresponding first port during a different one of a plurality of time windows; generating a plurality of second utilization vectors, each of the plurality of second utilization vectors corresponding to a different one of the plurality of second ports, each of the plurality of second utilization vectors including a respective set of second elements, each second element identifying a utilization of the second utilization vector's corresponding second port during a different one of the plurality of time windows; identifying a plurality of port pairs, each port pair including one of the plurality of first ports and one of the plurality of second ports; generating a plurality of combined utilization vectors, each of the plurality of combined utilization vectors corresponding to a different one of the plurality of port pairs and being generated based on the first and second utilization vectors for the first and second ports that are part of this port pair; updating the plurality of combined utilization vectors based on an expected usage of the storage entity to produce a plurality of updated utilization vectors; selecting one of the plurality of port pairs based on the plurality of updated utilization vectors; and assigning the selected port pair to the replication of data that is stored in the storage entity.

According to aspects of the disclosure, a system is provided, comprising: a memory; and at least one processor that is configured to perform the operations of: detecting an event that signals a start of a replication of data that is stored in a storage entity, the replication being performed between a first storage system and a second storage system; identifying a plurality of first ports in the first storage system; identifying a plurality of second ports in the second storage system; generating a plurality of first utilization vectors, each of the plurality of first utilization vectors corresponding to a different one of the plurality of first ports, each of the plurality of first utilization vectors including a respective set of first elements, each first element identifying a utilization of the first utilization vector's corresponding first port during a different one of a plurality of time windows; generating a plurality of second utilization vectors, each of the plurality of second utilization vectors corresponding to a different one of the plurality of second ports, each of the plurality of second utilization vectors including a respective set of second elements, each second element identifying a utilization of the second utilization vector's corresponding second port during a different one of the plurality of time windows; identifying a plurality of port pairs, each port pair including one of the plurality of first ports and one of the plurality of second ports; generating a plurality of combined utilization vectors, each of the plurality of combined utilization vectors corresponding to a different one of the plurality of port pairs and being generated based on the first and second utilization vectors for the first and second ports that are part of this port pair; updating the plurality of combined utilization vectors based on an expected usage of the storage entity to produce a plurality of updated utilization vectors; selecting one of the plurality of port pairs based on the plurality of updated utilization vectors; and assigning the selected port pair to the replication of data that is stored in the storage entity.

According to aspects of the disclosure, a non-transitory computer-readable medium storing one or more processor-executable instructions, which when executed by at least one processor cause the at least one processor to perform the operations of: detecting an event that signals a start of a replication of data that is stored in a storage entity, the replication being performed between a first storage system and a second storage system; identifying a plurality of first ports in the first storage system; identifying a plurality of second ports in the second storage system; generating a plurality of first utilization vectors, each of the plurality of first utilization vectors corresponding to a different one of the plurality of first ports, each of the plurality of first utilization vectors including a respective set of first elements, each first element identifying a utilization of the first utilization vector's corresponding first port during a different one of a plurality of time windows; generating a plurality of second utilization vectors, each of the plurality of second utilization vectors corresponding to a different one of the plurality of second ports, each of the plurality of second utilization vectors including a respective set of second elements, each second element identifying a utilization of the second utilization vector's corresponding second port during a different one of the plurality of time windows; identifying a plurality of port pairs, each port pair including one of the plurality of first ports and one of the plurality of second ports; generating a plurality of combined utilization vectors, each of the plurality of combined utilization vectors corresponding to a different one of the plurality of port pairs and being generated based on the first and second utilization vectors for the first and second ports that are part of this port pair; updating the plurality of combined utilization vectors based on an expected usage of the storage entity to produce a plurality of updated utilization vectors; selecting one of the plurality of port pairs based on the plurality of updated utilization vectors; and assigning the selected port pair to the replication of data that is stored in the storage entity.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

DETAILED DESCRIPTION

Data replication is a fundamental concept in storage systems that plays a pivotal role in ensuring data availability, fault tolerance, and performance optimization. Essentially, it involves creating and maintaining identical copies of data across multiple storage locations, be it within the same data center or distributed across geographically diverse sites. The primary objective of data replication is to enhance data resilience by mitigating the risks of hardware failures, disasters, or network disruptions.

Two different storage systems may be provided as part of the same storage environment. Over the course of the operation of the storage environment, data from one of the storage systems may be replicated to the other storage system. The replication of data may involve the establishment of a plurality of connections between the two storage systems and the transmission of data over the connections. Each connection may be established by using a different port pair. Each port pair may include one port in the first storage system and another port in the second storage system. Using the ports to replicate data may place a relatively heavy load on the ports. If the ports are overloaded, this could increase the latency of the storage environment. For this reason, it is important to select ports that would not be overwhelmed by the data replication.

The present disclosure provides a method and system for the selection of ports for use in data replication, which measures the utilization rate of the ports in storage systems and ensures that only those ports are selected which have sufficient capacity to accommodate the data replication. The method and system are discussed further below with respect to FIGS. 1-8. The method and system are advantageous because they prevent the creation of latency bottlenecks in a storage system that would result from a port being overloaded as a result of the port being assigned to perform data replication, which in turn results in an improved performance of the storage system.

Figure 1:
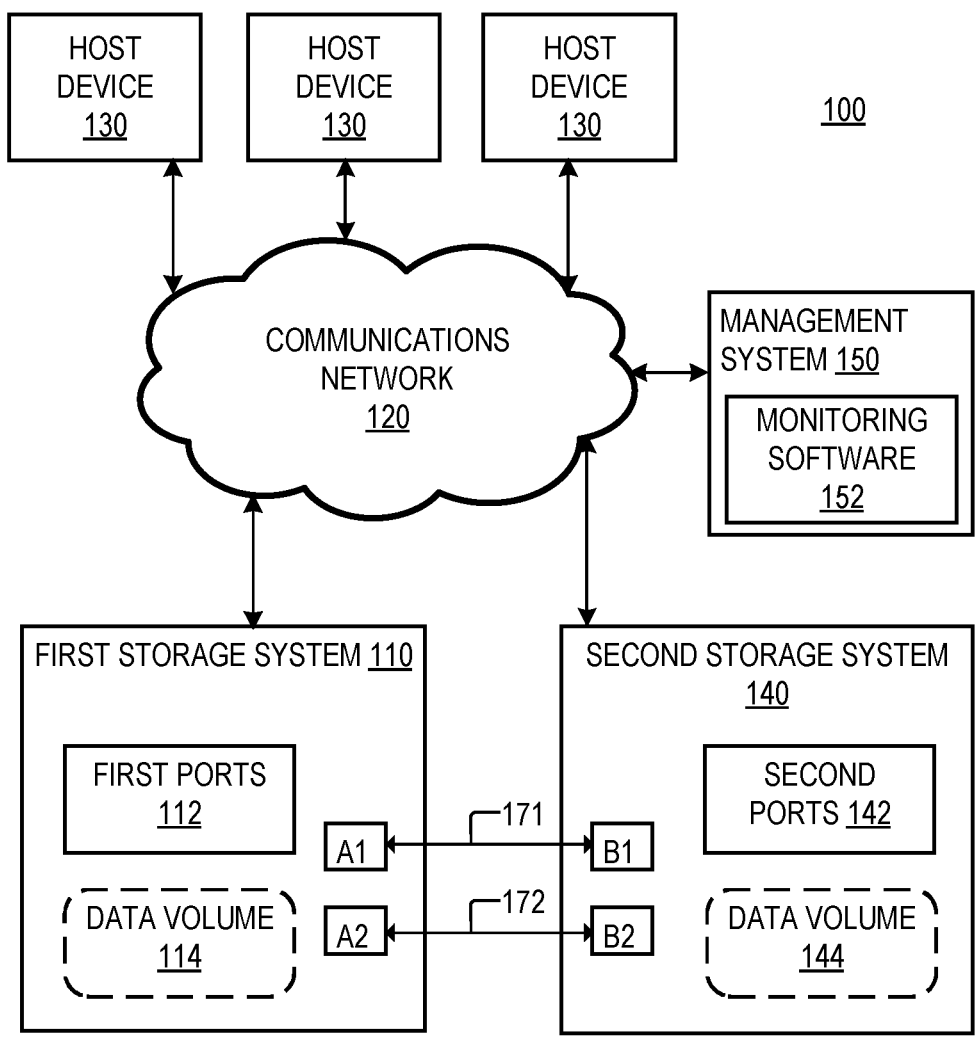
FIG. 1 is a diagram of an example of a system, according to aspects of the disclosure.

FIG. 1 is a diagram of an example of a system 100, according to aspects of the disclosure. As illustrated, system 100 may include storage systems 110 and 140, a plurality of host devices, and a management system 150, which are coupled with each other via a communications network 120. The communications network 120 may include one or more of an InfiniBand network, a Fibre Channel (FC) network, a local area network, a wide area network, and/or any other suitable type of network. Each of the host devices 130 may include a laptop computer, a desktop computer, a smartphone an Internet-of-Things device, and/or any other suitable type of computing device. In some implementations, each of the host devices 130 may have the same architecture as the computing device 800, which is discussed further below with respect to FIG. 8

Figure 8:
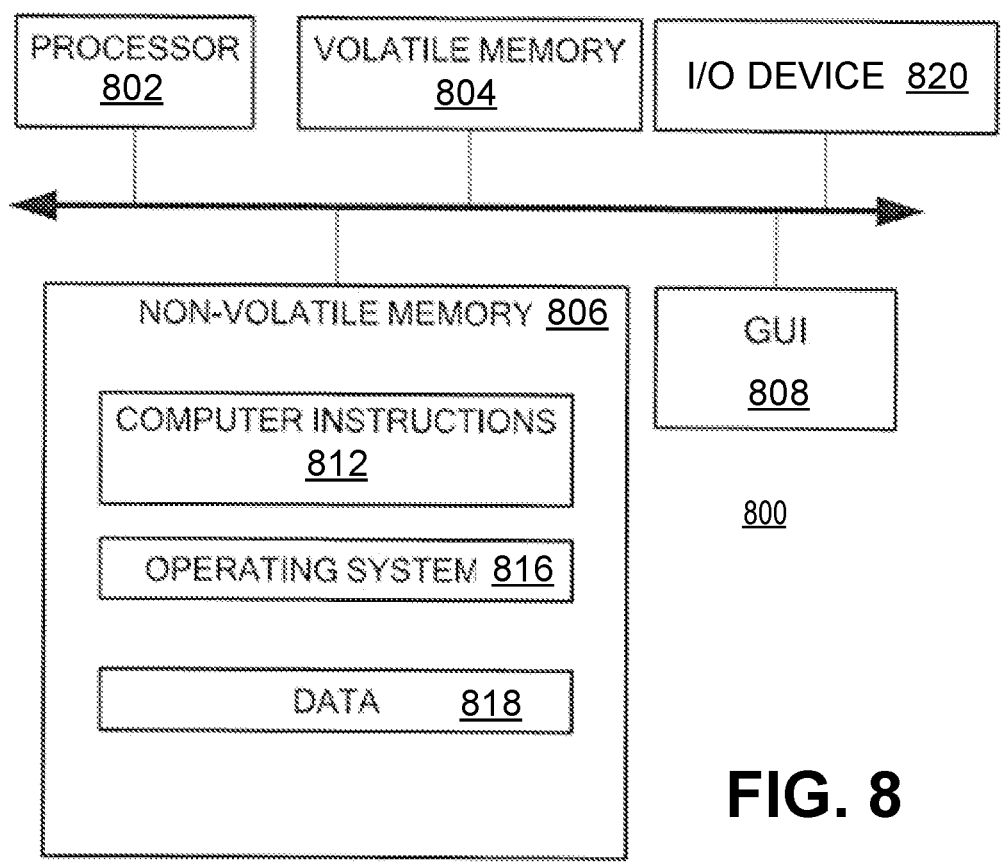
FIG. 8 is a diagram of an example of a computing device, according to aspects of the disclosure.

The storage system 110 may include a plurality of storage processors (not shown) and a plurality of storage devices (not shown). Each of the storage processors may include a computing device that is configured to receive I/O requests from any of the host devices 130 and execute the received I/O requests by reading or writing data to the storage devices. In some implementations, each of the storage processors may have an architecture that is the same or similar to the architecture of the computing device 800, which is shown in FIG. 8. The storage devices may include solid state drives (SSDs), hard disks (HDs), and/or any other suitable type of storage device.

The storage system 140 may include a plurality of storage processors (not shown) and a plurality of storage devices (not shown). In some implementations, each of the storage processors may have an architecture that is the same or similar to the architecture of the computing device 800, which is shown in FIG. 8. The storage devices may include solid state drives (SSDs), hard disks (HDs), and/or any other suitable type of storage device. During the operation of storage systems 110 and 140, data stored in storage system 110 is replicated to storage system 140 and/or vice versa.

Storage systems 110 and 140 may be configured to operate in an active-active or active-passive configuration. When they are configured in an active-active configuration, each of storage systems 110 and 140 would serve I/O requests from host devices 130, and the data associated with those requests would be replicated to the other of the storage systems 110 and 140. When they are configured in an active-passive configuration, only storage system 110 would serve I/O requests from host devices 130, and the data associated with those requests would be replicated to storage system 140. The present disclosure is not limited to any specific implementation of storage systems 110 and 140, and/or to any specific method for performing data replication. In one example, each of storage systems 110 and 140 may be a DELL PowerMax™ storage system or a DELL Metro™ storage system.

Storage system 110 may implement a data volume 114 and storage system 140 may implement a data volume 144. Each of data volumes 114 and 144 may include a raw data volume, a file system data volume, and/or any other suitable type of data volume. Data volumes 114 and 144 may be each other's replicas, and they may store the exact same content. The synchronization between data volumes 114 and 144 may be effectuated by using port pairs 171 and 172. Port pair 171 may include ports A1 and B1 and port pair 172 may include ports A2 and B2. The ports in port pair 171 may be used in a first connection between storage systems 110 and 140 that is used for replication of data, and the ports in port pair 172 may be used in a second connection between storage systems 110 and 140 that is used for the replication of data.

Storage system 110 may include a plurality of ports 112 and storage system 140 may include a plurality of ports 142. Each of the pluralities of ports 112 and 142 may also be referred to as a "group of ports" or a "set of ports". Ports A1 and A2 may be selected from the set of ports 112 for use in the replication of data. Ports B1 and B2 may be selected from the set of ports 142 for use in the replication of data. The selection of ports A1, A2, B1, and B2, may be performed in accordance with a process 700, which is discussed further below. Process 700 may be executed by management system 150 and/or any other suitable computing device.

Management system 150, may include a computing device, such as the computing device 800, which is discussed further below with respect to FIG. 8. Management system 150 may be configured to execute monitoring software 152. Monitoring software 152 may be configured to calculate (or measure) metrics related to the utilization of different ports in groups 112 and 142. Such metrics may include bits per second (bps), I/Os per second, and/or any other suitable type of metric that measures the amount of data that passes through a port and/or the port's utilization rate (or level of utilization). These metrics can be used in the generation of utilization vectors, which are discussed further below (e.g., see FIG. 3). Monitoring software 152 may be further configured to calculate (or measure) metrics related to the amount of data that is replicated between volumes 114 and 144 at different times. These metrics may identify bits per second that are replicated from volume 114 to volume 144 (and/or vice versa), and they can be used in the calculation of incoming load vectors (e.g., see FIG. 5).

Figure 2:
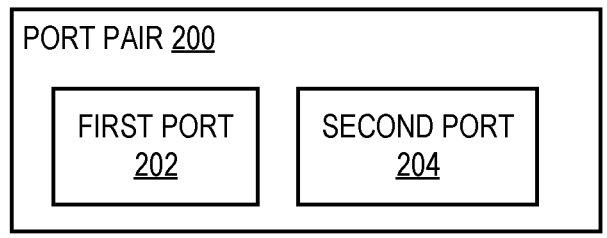
FIG. 2 is a diagram of an example of a port pair, according to aspects of the disclosure.

FIG. 2 is a diagram of an example of a port pair 200. Port pair 200 may be the same or similar to any of port pairs 171 and 172. Port pair 200 may include port 202 and port 204. Port 202 may be a port in storage system 110. Port 202 may be part of the group of ports 112. Port 202 may be the same or similar to any of ports A1 and A2. Port 204 may be part of the group of ports 142. Port 204 may be the same or similar to any of ports B1 and B2. Port pair 200 may be used for the replication of data between volumes 114 and 144. The discussion that follows provides an example of different vectors that are used to determine whether port pair 200 should be assigned to perform data replication between volumes 114 and 144.

Figure 3:
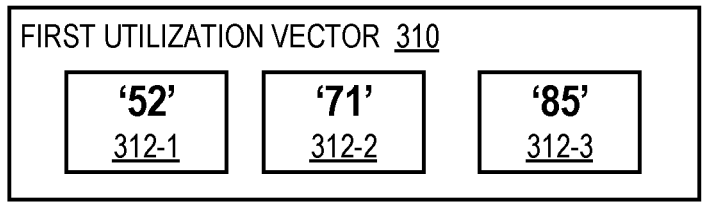
FIG. 3 is a diagram of an example of a pair of utilization vector, according to aspects of the disclosure.
Figure 3:
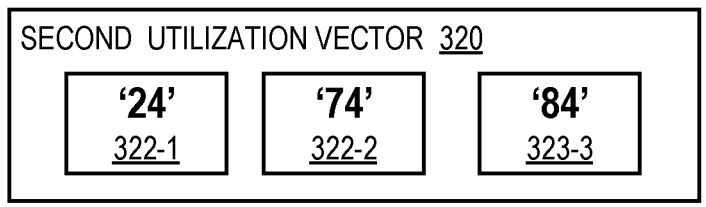

FIG. 3 is a diagram of an example of utilization vectors 310 and 320. Utilization vector 310 describes the utilization of port 202. Utilization vector 310 includes elements 312-1, 312-2, and 312-3. Each of elements 312 may include a number (or a string or alphanumerical string) that indicates the utilization of port 202 during a different time window. The utilization of port 202 may be measured in bits per second (e.g., mbps or kbps) that pass through port 202 or in any other suitable manner. Utilization vector 320 includes elements 322-1, 322-2, and 322-3. Each of elements 322 may include a number (or a string or alphanumerical string) that indicates the utilization of port 204 during a different time window. The utilization of port 204 may be measured in bits per second that pass through port 204 or in any other suitable manner. In a preferred implementation, the utilization of any port, such as ports 202 and 204, may be measured as a percentage or ratio of the actual measured/observed load on the port (e.g., in mbps) to the max performance capability of the port.

According to the present example, the value of element 312-1 is '52', the value of element 312-2 is '71', the value of element 312-3 is '85', the value of element 322-1 is '24', the value of element 322-2 is '74', and the value of element 322-3 is '84'. The values of elements 312 and 322 are provided for illustrative purposes only, and they are not intended to suggest a particular formatting or scale. According to the present example, elements 312-1 and 322-1 indicate the utilization of ports 202 and 204, respectively, during a first time window on the same day (e.g., 10:00 am-2:00 pm on Mar. 1, 2024 or the same Monday). Elements 312-2 and 322-2 indicate the utilization of ports 202 and 204, respectively, during a second time window on the same day (e.g., 2 pm-6 pm on Mar. 1, 2024 or the same Monday). Elements 312-3 and 322-3 indicate the utilization of ports 202 and 204, respectively, during a third time window on the same day (e.g., 6 pm-10 pm on Mar. 1, 2024 or the same Monday).

In practice, the utilization vector of a port may include a much larger number of elements than what is shown in FIG. 3. For example, the utilization vector may be calculated by monitoring the utilization of a port over an entire week. Each element in the utilization vector may indicate the utilization of the port during a different 4-hour period in the week. Each element may be calculated by taking 5-minute samples of the port's utilization and calculating their weighted average. The weight applied to each 5-minute sample may be directly proportional to the load that is being placed on the storage system of which the port is part (e.g., the number of IOs per second that are being served by the storage system). Thus, if the system is experiencing a higher load, the weight would have a higher value than when the system is experiencing a lower load. Biasing the elements in a utilization vector towards times of high load is advantageous because it helps build greater confidence that a port selected based on the utilization vector would perform adequately during times of high stress.

In one example, two 1-week utilization vectors for the same port, such as the one discussed, may be averaged out to produce another utilization vector that is subsequently used as "the utilization vector" for the port. The first 1-week vector may include a plurality of elements A where each element corresponds to a different 4-hour period in a first week. The second vector may include a plurality of elements B where each element corresponds to a different 4-hour period in a second week. For example, the first element in the first vector (i.e., element A1) may indicate the utilization of the port between 10:00 am and 2 pm on Monday of the first week, and the first element in the second vector (i.e., element B1) may indicate the utilization of the port between 10:00 am and 2 pm on Monday of the second week. The second element in the first vector (i.e., element A2) may indicate the utilization of the port between 2 μm and 6 pm on Monday of the first week, and the second element in the second vector (i.e., element Bk) may indicate the utilization of the port between 2 μm and 6 pm on Monday of the second week, and so forth. In other words, elements in the first vector and the second vector that bear the same index i are calculated by measuring the utilization of the port during the same period in different weeks. Each element $C_i$ in the averaged vector may be equal to the average of elements $A_i$ and $B_i$. Although only two utilization vectors are averaged, alternative implementations are possible in which more than two utilization vectors are averaged.

Figure 4:
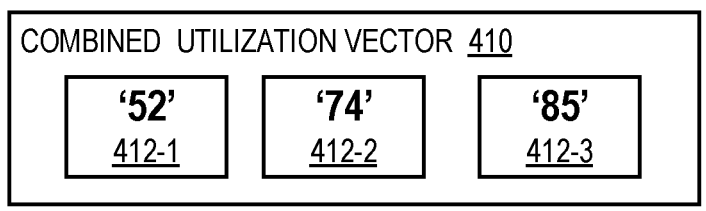
FIG. 4 is a diagram of an example of a combined utilization vector, according to aspects of the disclosure.

FIG. 4 is a diagram of an example of a combined utilization vector 410 for port pair 200, according to aspects of the disclosure. A combined utilization vector for a port pair is generated by combining the individual utilization vectors for the ports in the pair. According to the example of FIG. 4, vector 410 is generated by combining utilization vectors 310 and 320. Vector 410 includes elements 412-1, 412-2, and 412-3. Element 412-1 is equal to the greater of elements 312-1 and 322-1 (i.e., '52'), element 412-2 is equal to the greater of elements 312-2 and 322-2 (i.e., '74'), and element 412-3 is equal to the greater of elements 312-3 and 322-3 (i.e., 85'). In other words, each element 412-*i* in vector 410 is equal to max (312-*i* and 323-*i*). Vector 410 is provided for illustrative purposes. In some implementations, vector 410 may include more than three elements, as discussed above with respect to FIG. 3.

In some implementations, when a combined utilization vector is produced by combining a first utilization vector with a second utilization vector, each element in the combined utilization vector may correspond to a different time window. Furthermore, each element in the combined utilization vector may be equal to the greater of the elements from the first and second utilization vectors that correspond to the same time window as the element in the combined utilization vector. In other words, two utilization vectors X and Y can be used to produce a combined utilization vector Z in accordance with equation 1 below, $$z_i = \max(x_i, y_i) \qquad (1)$$

where i is an element index that corresponds to a particular time window, $z_i$ is the element of the combined utilization vector for time window i, $x_i$ is the element of utilization vector x for time window i, $y_i$ is the element of utilization vector y for time window i, and max is a function that returns the largest one of its arguments.

According to the present example, the combined utilization vector is a bucket-wise max of the first week and the second week 1, however the present disclosure is not limited thereto. For example, in some implementations, the combined utilization vector may be calculated in accordance with equation 1.1 below:

$$z_i = (x_i + y_i) + |x_i - y_i| \qquad (1.1)$$

where i is an element index that corresponds to a particular time window, $z_i$ is the element of the combined utilization vector for time window i, $x_i$ is the element of utilization vector x for time window i, $y_i$ is the element of utilization vector y for time window i, a is a first weight, and b is a second weight.

Figure 5:
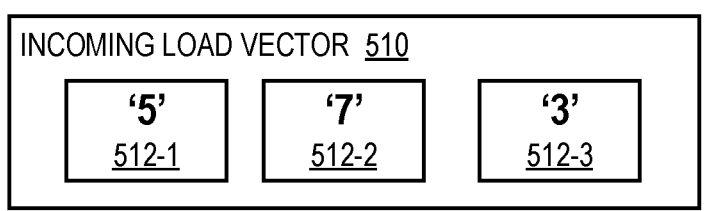
FIG. 5 is a flowchart of an example of an incoming load vector, according to aspects of the disclosure.

FIG. 5 is a diagram of an incoming load vector 510, according to aspects of the disclosure. According to the present example, vector 510 corresponds to volumes 114 and 144. Vector 510 indicates the additional load that would be placed on port pair 200 if that port pair is assigned to perform data replication between volumes 114 and 144. Vector 510 includes elements 512-1, 512-2, and 512-3. Each of elements 512 may include a number (or a string or alphanumerical string) that indicates the additional load that would be placed on ports 202 and 204 if port pair 200 were to be used to transfer replication data for volumes 114 and 144. In one example, each of elements 512 may indicate the bits per second of data that would be directly attributable to the replication of data from volume 114 to volume 144 (and/or from volume 144 to volume 114). According to the present example, element 512-1 identifies the additional load (e.g., '5') that would be placed on ports 202 and 204 during the first time window (10:00 am-2:00 pm) as a consequence of port pair 200 being assigned to perform data replication between volumes 114 and 144. Element 512-2 identifies the additional load (e.g., '7') that would be placed on ports 202 and 204 during the second time window (2:00 pm-6:00 pm) as a consequence of port pair 200 being assigned to perform data replication between volumes 114 and 144. Element 512-3 identifies the additional load (e.g., '7') that would be placed on ports 202 and 204 during the third time window (6:00 pm-10:00 pm) as a consequence of port pair 200 being assigned to perform data replication between volumes 114 and 144.

In some implementations, the time windows that are associated with vector 510 may be the same time windows as those that are associated with vectors 310, 320, and 410. That is, every element having index i in each of vectors 310, 320, 410, and 520 may correspond to the same time window. In one example, a time window may be identified by the day of the week of which the time window is part (e.g., MON-SUN), a starting time of the time window, and an end time of the time window. In another example, a time window may be identified based on just a starting time and an end time. In yet another example, a time window may be identified by a day of which the time window is part, a starting time of the time window, and an end time of the time window.

In one example, the incoming load vector (e.g., vector 510), which corresponds to a volume pair (e.g., volumes 114 and 144) and a particular port pair (e.g., port pair 200), may be identified by determining the total amount of data that would flow between the volumes (as a result of one of the volumes being replicated to the other and/or vice versa) and dividing that amount by the number of port pairs that would be assigned for use in performing data replication between the volumes. More specifically, a total load vector may be determined based on a historical record of the amount of data that has been replicated between the volumes in the past. Each element in the total load vector may correspond to a different time window. Each element in the total load vector may identify the amount of data that would flow between the two volumes as a result of the performance of data replication. For example, each element in the total load vector may identify the bits per second that would be exchanged between the volumes as a result of performing data replication. The incoming load vector for an individual port pair may be obtained by dividing the total load vector by the number of port pairs that would be assigned to perform data replication between the volumes in the volume pair. In this regard, the i-th element in the incoming load vector for an individual port pair would be equal to the i-th element in the total load vector divided by the number of load pairs that are going to be assigned to perform data replication between the volumes in the volume pair. In the example of FIG. 1, two ports are assigned to perform data replication, but that number can be greater. The number of ports that are going to be used for data replication is a matter of a policy or configuration setting that is set by a system administrator.

In some implementations, the time windows that are associated with the total load vector may be the same time windows as those that are associated with vectors 310, 320, and 410. That is, every element having index i in each of vectors 310, 320, 410, and the total load vector may correspond to the same time window. Furthermore, each of vectors 310, 320, and 410 may contain the same number of elements as the rest of vectors 310, 320, and 410.

Figure 6:
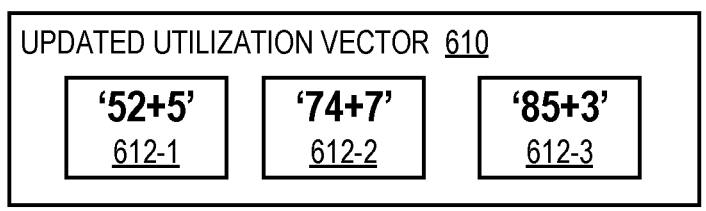
FIG. 6 is a diagram of an example of an updated utilization vector, according to aspects of the disclosure.

FIG. 6 is a diagram of an example of an updated utilization vector 610 for port pair 200, according to aspects of the disclosure. The updated utilization vector 610 may be generated by adding the incoming load vector 510 to the combined utilization vector 410. The updated utilization vector 610 may indicate the total load that would be incident on the ports in port pair 200 if port pair 200 were to be assigned to perform data replication between volumes 114 and 144. Vector 610 may include elements 612-1, 612-2, and 612-3). According to the present example, element 612-1 identifies the total load (e.g., '57') that would be placed on ports 202 and 204 during the first time window (10:00 am-2:00 pm) when port pair 200 is assigned to perform data replication between volumes 114 and 144. Element 612-2 identifies the total load (e.g., '81') that would be placed on ports 202 and 204 during the second time window (2:00 pm-6:00 pm) when port pair 200 is assigned to perform data replication between volumes 114 and 144. Element 612-3 identifies the total load (e.g., '88') that would be placed on ports 202 and 204 during the third time window (6:00 pm-10:00 pm) when port pair 200 is assigned to perform data replication between volumes 114 and 144. In general, the i-th element in the incoming load vector for an individual port pair would be equal to (or otherwise based on) the sum of the-th element in vector 410 and the i-th element in vector 510. In some implementations, the time windows that are associated with vector 610 may be the same time windows as those that are associated with vectors 310, 320, 410, and 510. That is, every element having index i in each of vectors 310, 320, 410, 510, and 610 may correspond to the same time window.

Figure 7A:
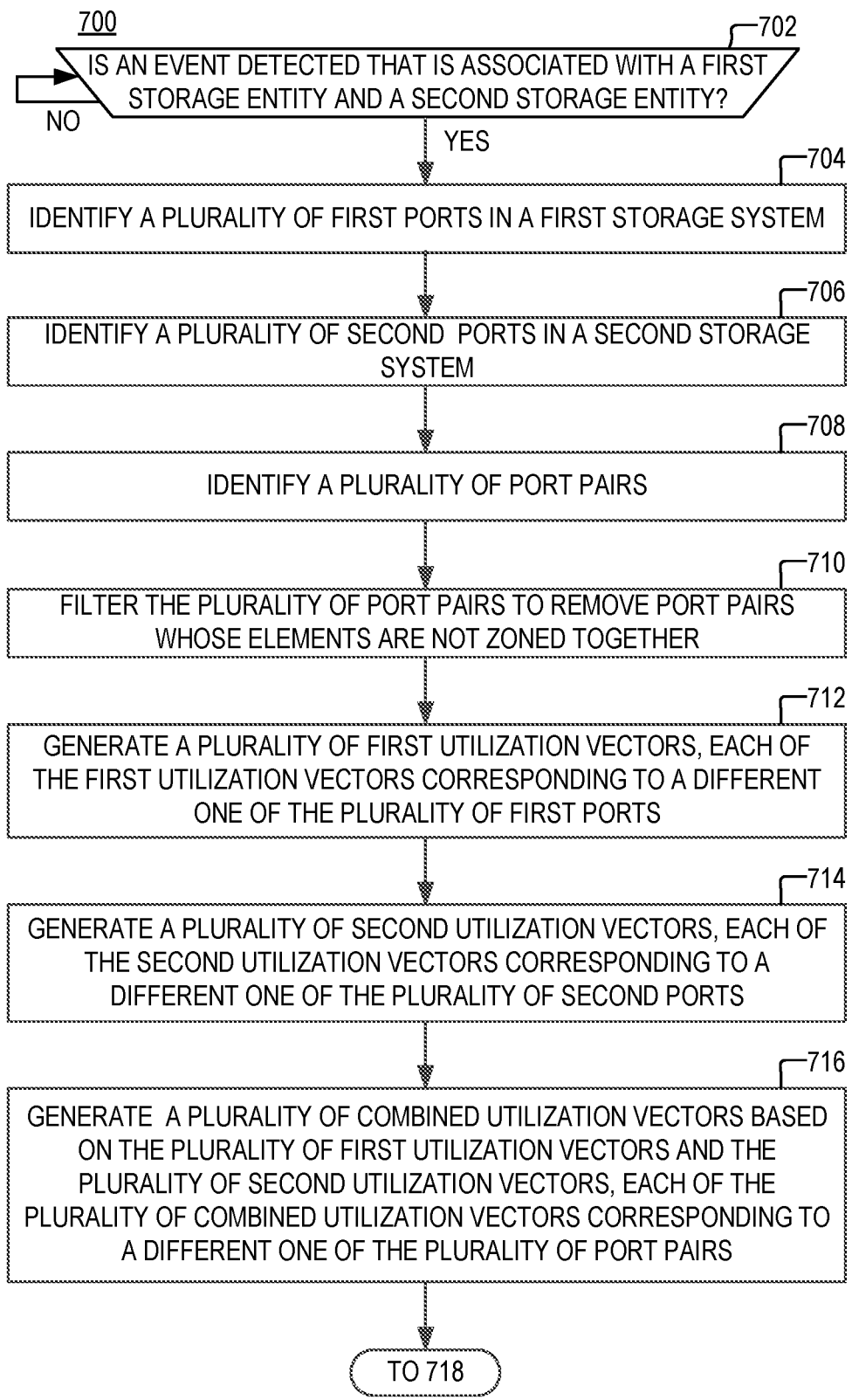
FIG. 7A is a flowchart of an example of a process, according to aspects of the disclosure.
Figure 7B:
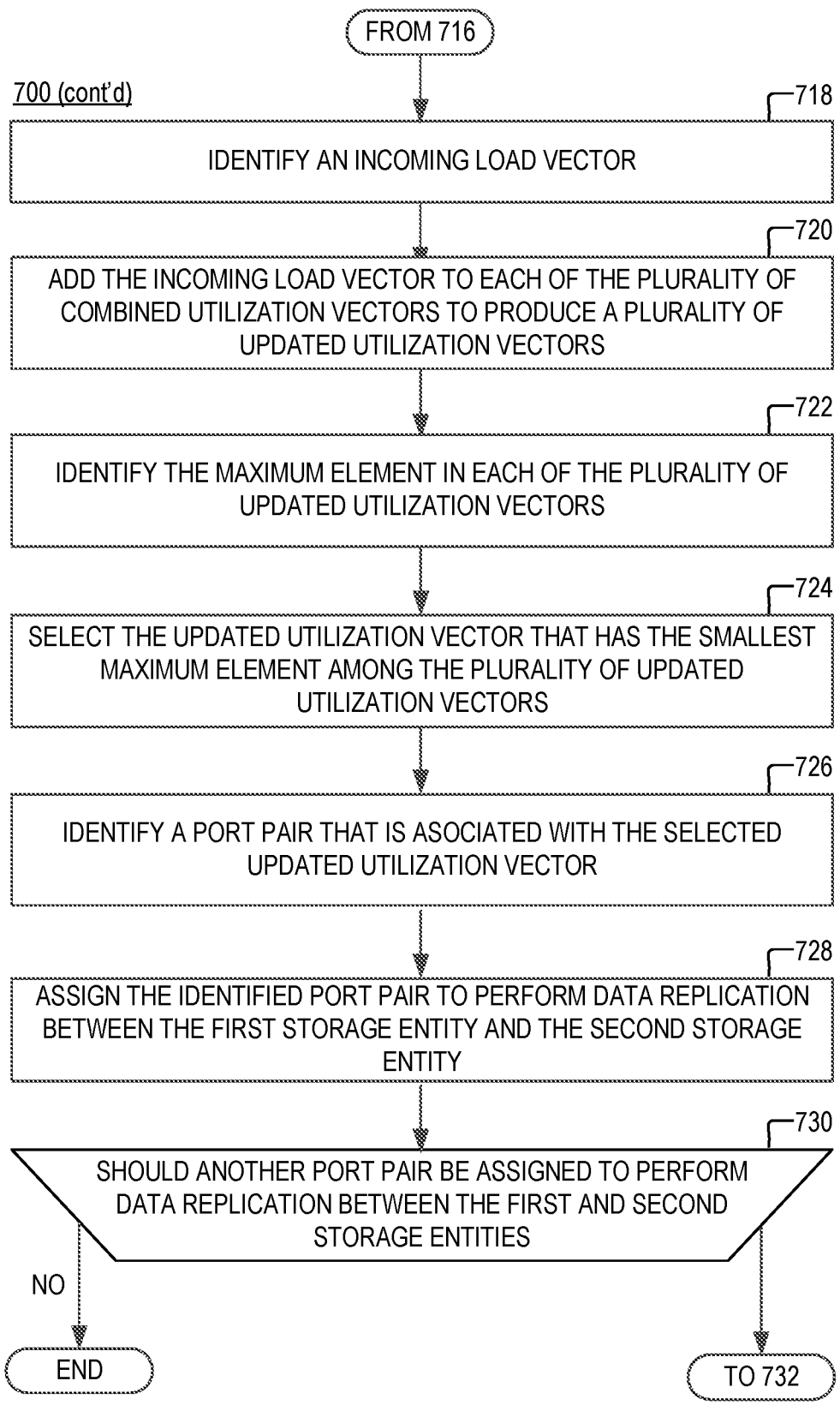
FIG. 7B is a flowchart of an example of a process, according to aspects of the disclosure.
Figure 7C:
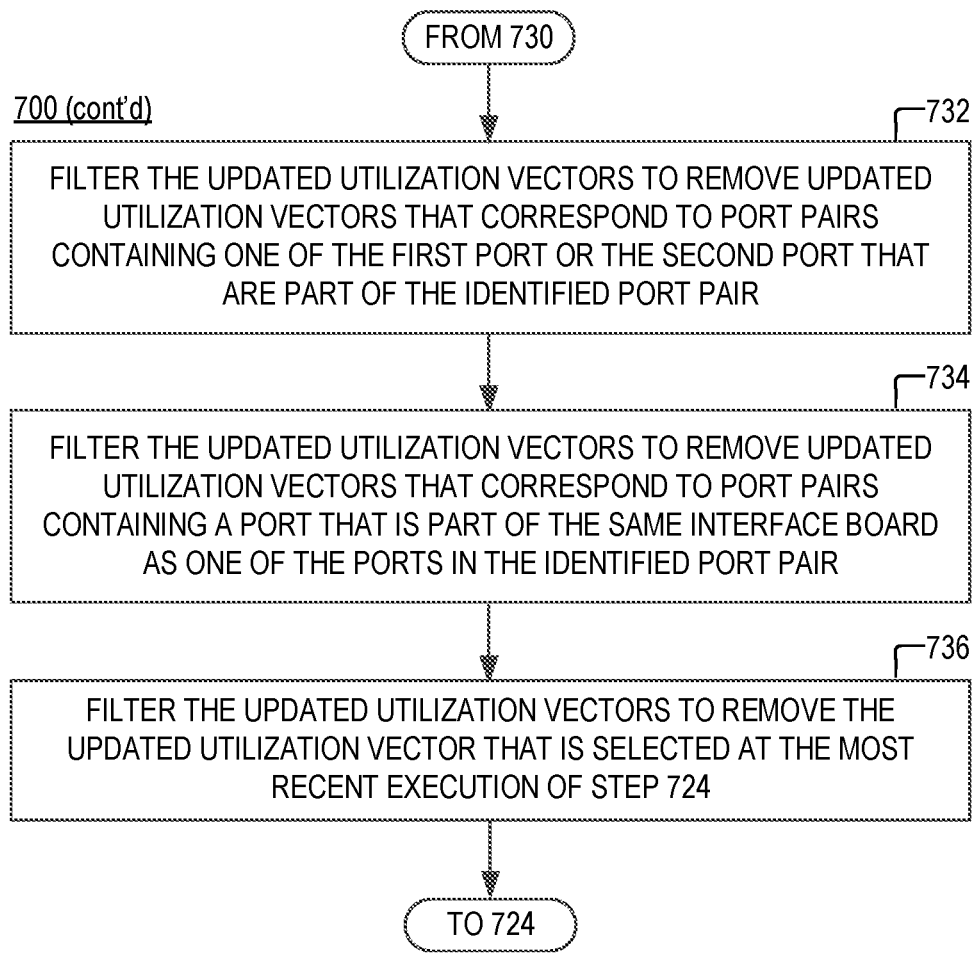
FIG. 7C is a flowchart of an example of a process, according to aspects of the disclosure.

FIGS. 7A-C show a flowchart of an example of a process 700, according to aspects of the disclosure. According to the present example, process 700 is executed by management system 150. However, the present disclosure is not limited to any specific entity executing process 700.

At step 702, the management system 150 detects whether a predetermined event is generated that triggers data replication between a first storage system and a second storage system. According to the present example, the first event is an event that triggers the replication of data between a first storage entity (in the first storage system) and a second storage entity (in the second storage system). According to the present example, the first storage entity is volume 114 and the second storage entity is volume 144. However, in alternative implementations, the first storage entity may include a different volume, a group of volumes, and/or any other suitable type of storage group that is hosted on the first storage system. Similarly, in alternative implementations, the second storage entity may include a different volume, a group of volumes, and/or any other suitable type of storage group that is hosted on the second storage system. In some implementations, the first event may be generated when one or both volumes 114 and 144 come online. Additionally or alternatively, in some implementations, the event may be generated when a system administrator changes a configuration setting of one or both of storage systems 110 and 140, thereby causing the storage systems 110 and 140 to begin synchronizing the respective states of volumes 114 and 144.

At step 704, the management system 150 identifies a plurality of first ports in the first storage system. According to the present example, management system 150 identifies the ports in group 112 (shown in FIG. 1). In some implementations, at step 704, management system 150 may generate a list that includes the respective identifier of each of the first ports.

At step 706, the management system 150 identifies a plurality of second ports in the second storage system. According to the present example, management system 150 identifies the ports in group 142 (shown in FIG. 1). In some implementations, at step 704, management system 150 may generate a list that includes the respective identifier of each of the second ports.

At step 708, the management system 150 identifies a plurality of different port pairs. Each of the port pairs includes one of the first ports and one of the second ports. According to the present example, each of the plurality of port pairs includes one port that is part of group 112 and one port that is part of group 142. In some implementations, the management system 150 may identify all pairwise combinations between the first ports and the second ports (e.g., the ports in group 112 and the ports in group 142). According to the present example, two port pairs are different if at least one of the ports in one of the pairs is not part of the other port pair. In some implementations, at step 708, management system 150 may generate a list that includes a different respective identifier for each of the port pairs.

At step 710, the management system 150 filters the plurality of port pairs to remove port pairs whose ports are not zoned together. The term zoning, as used herein, may refer to an association between the ports one storage system with the ports on another storage system. In implementations in which the Dell PowerMax™™ is used, zoning may refer to the association of SRDF (Symmetrix Remote Data Facility) ports on one storage array to SRDF ports on another storage array via the SAN fabric. In some implementations, at step 710, management system 150 may delete the port pair from the list that is generated at step 708 the identifiers for the port pairs whose ports are not zoned together. In some implementations, step 710 may be omitted.

At step 712, the management system 150 generates a plurality of first utilization vectors. Each of the plurality of first utilization vectors may be a utilization vector for a different one of the first ports (identified at step 704). Each of the plurality of first utilization vectors may be the same or similar to utilization vector 310, which is discussed above with respect to FIG. 3. Each of the plurality of utilization vectors may be generated in the manner discussed above with respect to utilization vector 310. In some implementations, at step 712, management system 150 may generate a list that includes the first utilization vectors.

In some implementations, after step 712 is completed, management system 150 may: (i) identify all first utilization vectors that include an element exceeding a predetermined threshold, (ii) identify the first ports that correspond to the identified first utilization vectors, and (ii) remove the identified first ports from the list generated at step 704, and/or (iv) remove each of the port pairs that include one of the identified first ports from the list generated at step 708. This may have the effect of taking out of consideration any first ports that are currently loaded close to the limit of their capacity.

At step 714, the management system 150 generates a plurality of second utilization vectors. Each of the plurality of second utilization vectors may be a utilization vector for a different one of the second ports (identified at step 706). Each of the plurality of second utilization vectors may be the same or similar to utilization vector 320, which is discussed above with respect to FIG. 3. Each of the plurality of second utilization vectors may be generated in the manner discussed above with respect to utilization vector 320. In some implementations, at step 714, management system 150 may generate a list that includes the second utilization vectors.

In some implementations, after step 714 is completed, management system 150 may: (i) identify all second utilization vectors that include an element exceeding a predetermined threshold, (ii) identify the second ports that correspond to the identified second utilization vectors, and (ii) remove the identified second ports from the list generated at step 706, and/or (iv) remove each of the port pairs that include one of the identified second ports from the list generated at step 708. This may have the effect of taking out of consideration any second ports that are currently loaded close to the limit of their capacity.

At step 716, the management system 150 generates a plurality of combined utilization vectors. Each of the plurality of combined utilization vectors corresponds to a different one of the port pairs (i.e., the port pairs that remain identified in the list of port pairs). Each of the plurality of combined utilization vectors may be generated by combining the first utilization vector for the first port in the combined utilization vector's corresponding port pair with the second utilization vector for the second port in the combined utilization vector's corresponding port pair. Each of the plurality of combined utilization vectors may be the same or similar to combined utilization vector 410, which is discussed above with respect to FIG. 4. Each of the plurality of combined utilization vectors may be generated in the same manner as discussed above with respect to vector 410. In some implementations, at step 716, management system 150 may generate a list that includes the combined utilization vectors.

At step 718, the management system identifies an incoming load vector for the pair of storage entities consisting of the first and second storage entities, which are discussed above with respect to step 702. The incoming load vector indicates the additional load that would be placed on a pair of ports by virtue of the pair of ports being assigned to perform data replication between the first storage entity and the second storage entity (i.e., data replication from the first storage entity to the second storage entity and/or data replication from the second storage entity to the first storage entity). The incoming load vector may be the same or similar to incoming load vector 510, which is discussed above with respect to FIG. 5. The incoming load vector may be generated in the manner discussed above with respect to FIG. 5.

At step 720, each of the plurality of combined utilization vectors (identified at step 716) is combined, by management system 150, with the incoming load vector (identified at step 718) to produce a plurality of updated utilization vectors. Each of the updated utilization vectors may be the same or similar to updated utilization vector 610, which is discussed above with respect to FIG. 6. Each of the updated utilization vectors may be generated in the manner discussed above with respect to FIG. 6. In some implementations, at step 720, management system 150 may generate a list that includes the updated utilization vectors.

In some implementations, after step 720 is completed, management system 150 may: (i) identify all combined utilization vectors that include an element exceeding a predetermined threshold, (ii) remove the identified combined utilization vectors from the list generated at step 720. This may have the effect of taking out of consideration any first ports that would become loaded too close to the limit of their capacity if they were assigned to perform data replication.

At step 722, the management system 150 identifies the maximum element in each of the plurality of updated utilization vectors (i.e., the updated utilization vectors that remain present in the list of updated utilization vectors). The maximum element in an updated utilization vector is the element having the largest value among all elements in the combined utilization vector. In the example of FIG. 6, element 612-3 is a maximum element.

At step 724, the management system 150 selects one of the updated utilization vectors (identified at step 718) which has the smallest maximum element among the maximum elements of all of updated utilization vectors in the plurality (i.e., out of all of the updated utilization vectors that remain in the list of updated utilization vectors).

At step 726, the management system 150 identifies the port pair that is associated with the selected updated utilization vector. According to the present example, the port pair associated with the selected updated utilization vector is the port pair that corresponds to the combined utilization vector that is used as a basis for generating the updated utilization vector (e.g., by adding the combined utilization vector to the incoming load vector identified at step 718).

At step 728, the management system 150 assigns the port pair (identified at step 726) to perform data replication between the first storage entity and the second storage entity. According to the present example, assigning the identified port pair to perform data replication may include any action that would cause the data replication between the first storage entity and the second storage entity to be performed by using the identified port pair. In some implementations, assigning the first port pair may include updating respective data structures in the first storage system and the second storage system to identify the first port as one that is to be used for performing data replication between the first storage entity and the second storage entity. In some implementations, one of the data structures may specify that at least some of the replication data originating from the first storage entity should be transmitted via a connection starting at the first port that is part of the port pair and terminating at the second port that is part of the port pair. The other one of the data structures may specify that at least some of the replication data originating from the second storage entity should be transmitted via a connection starting at the second port that is part of the port pair and terminating at the first port that is part of the port pair.

At step 730, the management system 150 identifies whether one or more additional port pairs need to be assigned to perform replication between the first storage entity and the second storage entity. For example, the management system 150 may retrieve a configuration setting (or policy) that specifies the count of port pairs that need to be assigned to perform replication between the first and second storage entities. If fewer port pairs than the count have been assigned so far, process 700 proceeds to step 732. Otherwise, process 700 ends.

At step 732, the management system 150 filters the plurality of updated utilization vectors to remove updated utilization vectors that correspond to port pairs including one of the first port or the second port which are part of the port pair that is identified at step 726. As noted above, the identified port pair (at step 726) may include a given first port and a given second port. Accordingly, management system 150 may identify all port pairs that include either the given first port or the given second port. Next, the management system 150 may identify any updated utilization vectors that correspond to one of the identified port pairs. And finally, the management system may remove the identified updated utilization vectors from the plurality of updated utilization vectors that will be considered in the next iteration of step 724. The removal may include deleting the updated utilization vectors from the list that is initially generated at step 720.

At step 734, the management system 150 filters the plurality of updated utilization vectors to remove updated utilization vectors that correspond to port pairs including a port that is part of the same adapter board (e.g., the same host bus adapter or director, etc.) as any of the first port or the second port which are part of the port pair that is identified at step 726. As noted above, the identified port pair (at step 726) may include a given first port and a given second port. Accordingly, management system 150 may identify all port pairs that include a port that is part of the same adapter board as one of the given first port and/or the given second port. Next, the management system 150 may identify any updated utilization vectors that correspond to one of the identified port pairs. And finally, the management system may remove the identified updated utilization vectors from the plurality of updated utilization vectors that will be considered in the next iteration of step 724. The removal may include deleting the updated utilization vectors from the list that is initially generated at step 720.

At step 736 the management system 150 deletes from the plurality of updated utilization vectors, the updated utilization vector that is selected as a result of the most recent execution of step 724. The removal may deleting from the list of updated utilization vectors that would be considered in the next iteration of step 724 (which essentially prevents the same utilization vector from being selected twice). After step 736 is completed, process 700 returns to step 722, and steps 726-724 are executed based on the vectors that remain in the list (or one or more data structures) after the completion of step 736.

Process 700 is provided as an example only. At least some of the steps in process 700 may be performed in a different order, in parallel, or altogether omitted. Steps 732-736 ensure that after process 700 is finished executing, the port pairs that are assigned to perform data replication would contain completely different ports that are situated on different adapter boards (e.g., directors). This is advantageous because it increases the redundancy (and fault-tolerance) of the selected port pairs. Although steps 732-736 operate by deleting information from the list of updated utilization vectors, in alternative implementations other lists may be updated to achieve the same effect (provided that process 700 returns after step 736 to an earlier step than step 722). The term "list" as used herein may refer to one or more data structures that are stored in the memory of management system 150 or elsewhere.

Referring to FIG. 8, in some embodiments, a computing device 800 may include processor 802, volatile memory 804 (e.g., RAM), non-volatile memory 806 (e.g., a hard disk drive, a solid-state drive such as a flash drive, a hybrid magnetic and solid-state drive, etc.), graphical user interface (GUI) 808 (e.g., a touchscreen, a display, and so forth) and input/output (I/O) device 820 (e.g., a mouse, a keyboard, etc.). Non-volatile memory 806 stores computer instructions 812, an operating system 816 and data 818 such that, for example, the computer instructions 812 are executed by the processor 802 out of volatile memory 804. Program code may be applied to data entered using an input device of GUI 808 or received from I/O device 820.

FIGS. 1-8 are provided as an example only. In some embodiments, the term "I/O request" or simply "I/O" may be used to refer to an input or output request. In some embodiments, an I/O request may refer to a data read or write request. At least some of the steps discussed with respect to FIGS. 1-6 may be performed in parallel, in a different order, or altogether omitted. As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used throughout the disclosure, the term "vector" refers to a sequence of numbers (and/or other elements). The phrase "the element having index i" refer to the i-th element in the sequence. For example, if i=1, the phrase i-th element in the sequence would refer to the first element in the sequence, if i=2, the phrase i-th element in the sequence would refer to the second element in the sequence, and so forth.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method, comprising:
    detecting an event that signals a start of a replication of data that is stored in a storage entity, the replication being performed between a first storage system and a second storage system;
    identifying a plurality of first ports in the first storage system;
    identifying a plurality of second ports in the second storage system;
    generating a plurality of first utilization vectors, each of the plurality of first utilization vectors corresponding to a different one of the plurality of first ports, each of the plurality of first utilization vectors including a respective set of first elements, each first element identifying a utilization of the first utilization vector's corresponding first port during a different one of a plurality of time windows;
    generating a plurality of second utilization vectors, each of the plurality of second utilization vectors corresponding to a different one of the plurality of second ports, each of the plurality of second utilization vectors including a respective set of second elements, each second element identifying a utilization of the second utilization vector's corresponding second port during a different one of the plurality of time windows;
    identifying a plurality of port pairs, each port pair including one of the plurality of first ports and one of the plurality of second ports;
    generating a plurality of combined utilization vectors, each of the plurality of combined utilization vectors corresponding to a different one of the plurality of port pairs and being generated based on the first and second utilization vectors for the first and second ports that are part of this port pair;
    updating the plurality of combined utilization vectors based on an expected usage of the storage entity to produce a plurality of updated utilization vectors;
    selecting one of the plurality of port pairs based on the plurality of updated utilization vectors; and
    assigning the selected port pair to the replication of data that is stored in the storage entity.

2. The method of claim 1, wherein any given one of the first elements in any of the plurality of first vectors includes a weighted average of key performance indicator measurements that are taken during the time window that corresponds to the given first element.

3. The method of claim 1, wherein updating the plurality of utilization vectors includes:
    generating an incoming load vector, the incoming load vector including a plurality of incoming load elements, each of the plurality of incoming load elements corresponding to a different one of the plurality of time windows, each of the plurality of incoming load elements identifying a load that would result from the replication of data that is stored in the storage entity; and
    adding the incoming load vector to each of the plurality of combined utilization vectors.

4. The method of claim 1, further comprising filtering the plurality of port pairs by removing port pairs in which the first and second ports are not zoned together.

5. The method of claim 1, wherein selecting one of the plurality of port pairs based on the plurality of updated utilization vectors includes identifying a respective maximum element of each of the plurality of updated utilization vectors, and identifying a port pair that corresponds to the updated utilization vector that has a smallest maximum element among the plurality of updated utilization vectors.

6. The method of claim 1, further comprising:
    filtering the plurality of first ports to remove first ports whose first vectors include at least one first element that exceeds a first predetermined threshold; and
    filtering the plurality of second ports to remove second ports whose second vectors include at least one second element that exceeds a second predetermined threshold.

7. The method of claim 1, wherein the storage entity includes a data volume.

8. The method of claim 1, wherein any given one of the plurality of combined utilization vectors includes a respective plurality of combined elements, each of the plurality of combined elements corresponding to a different one of the plurality of time windows, each of the plurality of combined elements being generated based on a given first element and a given second element that correspond to a same time window as the combined element, the given first and second elements being part of the respective first and second utilization vectors for the first and second ports that are part of the port pair that corresponds to the given utilization vector.

9. A system, comprising:
a memory; and
at least one processor that is configured to perform the operations of:
detecting an event that signals a start of a replication of data that is stored in a storage entity, the replication being performed between a first storage system and a second storage system;
identifying a plurality of first ports in the first storage system;
identifying a plurality of second ports in the second storage system;
generating a plurality of first utilization vectors, each of the plurality of first utilization vectors corresponding to a different one of the plurality of first ports, each of the plurality of first utilization vectors including a respective set of first elements, each first element identifying a utilization of the first utilization vector's corresponding first port during a different one of a plurality of time windows;
generating a plurality of second utilization vectors, each of the plurality of second utilization vectors corresponding to a different one of the plurality of second ports, each of the plurality of second utilization vectors including a respective set of second elements, each second element identifying a utilization of the second utilization vector's corresponding second port during a different one of the plurality of time windows;
identifying a plurality of port pairs, each port pair including one of the plurality of first ports and one of the plurality of second ports;
generating a plurality of combined utilization vectors, each of the plurality of combined utilization vectors corresponding to a different one of the plurality of port pairs and being generated based on the first and second utilization vectors for the first and second ports that are part of this port pair;
updating the plurality of combined utilization vectors based on an expected usage of the storage entity to produce a plurality of updated utilization vectors;
selecting one of the plurality of port pairs based on the plurality of updated utilization vectors; and
assigning the selected port pair to the replication of data that is stored in the storage entity.

10. The system of claim 9, wherein any given one of the first elements in any of the plurality of first vectors includes a weighted average of key performance indicator measurements that are taken during the time window that corresponds to the given first element.

11. The system of claim 9, wherein updating the plurality of utilization vectors includes:
generating an incoming load vector, the incoming load vector including a plurality of incoming load elements, each of the plurality of incoming load elements corresponding to a different one of the plurality of time windows, each of the plurality of incoming load elements identifying a load that would result from the replication of data that is stored in the storage entity; and
adding the incoming load vector to each of the plurality of combined utilization vectors.

12. The system of claim 9, wherein the at least one processor is further configured to perform the operation of filtering the plurality of port pairs by removing port pairs in which the first and second ports are not zoned together.

13. The system of claim 9, wherein selecting one of the plurality of port pairs based on the plurality of updated utilization vectors includes identifying a respective maximum element of each of the plurality of updated utilization vectors, and identifying a port pair that corresponds to the updated utilization vector that has a smallest maximum element among the plurality of updated utilization vectors.

14. The system of claim 9, wherein the at least one processor is further configured to perform the operations of:
filtering the plurality of first ports to remove first ports whose first vectors include at least one first element that exceeds a first predetermined threshold; and
filtering the plurality of second ports to remove second ports whose second vectors include at least one second element that exceeds a second predetermined threshold.

15. The system of claim 9, wherein the storage entity includes a data volume.

16. The system of claim 9, wherein any given one of the plurality of combined utilization vectors includes a respective plurality of combined elements, each of the plurality of combined elements corresponding to a different one of the plurality of time windows, each of the plurality of combined elements being generated based on a given first element and a given second element that correspond to a same time window as the combined element, the given first and second elements being part of the respective first and second utilization vectors for the first and second ports that are part of the port pair that corresponds to the given utilization vector.

17. A non-transitory computer-readable medium storing one or more processor-executable instructions, which when executed by at least one processor cause the at least one processor to perform the operations of:
detecting an event that signals a start of a replication of data that is stored in a storage entity, the replication being performed between a first storage system and a second storage system;
identifying a plurality of first ports in the first storage system;
identifying a plurality of second ports in the second storage system;
generating a plurality of first utilization vectors, each of the plurality of first utilization vectors corresponding to a different one of the plurality of first ports, each of the plurality of first utilization vectors including a respective set of first elements, each first element identifying a utilization of the first utilization vector's corresponding first port during a different one of a plurality of time windows;
generating a plurality of second utilization vectors, each of the plurality of second utilization vectors corresponding to a different one of the plurality of second ports, each of the plurality of second utilization vectors including a respective set of second elements, each second element identifying a utilization of the second utilization vector's corresponding second port during a different one of the plurality of time windows;
identifying a plurality of port pairs, each port pair including one of the plurality of first ports and one of the plurality of second ports;
generating a plurality of combined utilization vectors, each of the plurality of combined utilization vectors corresponding to a different one of the plurality of port pairs and being generated based on the first and second utilization vectors for the first and second ports that are part of this port pair;

updating the plurality of combined utilization vectors based on an expected usage of the storage entity to produce a plurality of updated utilization vectors;

selecting one of the plurality of port pairs based on the plurality of updated utilization vectors; and assigning the selected port pair to the replication of data that is stored in the storage entity.

18. The non-transitory computer-readable medium of claim 17, wherein any given one of the first elements in any of the plurality of first vectors includes a weighted average of key performance indicator measurements that are taken during the time window that corresponds to the given first element.

19. The non-transitory computer-readable medium of claim 17, wherein updating the plurality of utilization vectors includes:

generating an incoming load vector, the incoming load vector including a plurality of incoming load elements, each of the plurality of incoming load elements corresponding to a different one of the plurality of time windows, each of the plurality of incoming load elements identifying a load that would result from the replication of data that is stored in the storage entity; and adding the incoming load vector to each of the plurality of combined utilization vectors.

20. The non-transitory computer-readable medium of claim 17, wherein the at least one processor is further configured to perform the operation of filtering the plurality of port pairs by removing port pairs in which the first and second ports are not zoned together.

* * * * *